United States Patent [19]

Markwardt

[11] Patent Number: 4,621,977

[45] Date of Patent: Nov. 11, 1986

[54] CEILING FAN

[75] Inventor: Michael A. Markwardt, Ft. Worth, Tex.

[73] Assignee: Encon Industries, Inc., Fort Worth, Tex.

[21] Appl. No.: 791,750

[22] Filed: Oct. 28, 1985

[51] Int. Cl.⁴ ............................................. F04D 25/08
[52] U.S. Cl. ..................................... 416/5; 416/170 R
[58] Field of Search .................. 416/5, 170 C, 170 R; 310/61, 62

[56] References Cited

U.S. PATENT DOCUMENTS

| | | |
|---|---|---|
| 585,250 | 6/1897 | Bennett, Jr. |
| 1,445,402 | 2/1923 | LeVelle ............................. 416/5 X |
| 1,583,864 | 5/1926 | Tucker. |
| 1,935,314 | 11/1933 | Finch et al. |
| 3,002,118 | 9/1961 | Papst ........................... 416/170 C X |
| 4,073,598 | 2/1978 | Mizutani et al. ......................... 416/5 |
| 4,342,073 | 7/1982 | Ranten .............................. 416/5 X |
| 4,382,400 | 5/1983 | Stutzman ......................... 98/40 DL |
| 4,402,649 | 9/1983 | Laurel ................................. 416/5 |
| 4,422,824 | 12/1983 | Eisenhardt, Jr. ..................... 416/5 |
| 4,508,958 | 4/1985 | Kan et al. ........................... 219/369 |
| 4,511,310 | 4/1985 | Pearce ............................ 416/134 R |
| 4,538,973 | 9/1985 | Angott ............................ 416/170 C |

FOREIGN PATENT DOCUMENTS

| | | | |
|---|---|---|---|
| 478417 | 1/1938 | United Kingdom .................... 416/5 |
| 2031068 | 4/1980 | United Kingdom .................... 416/5 |

Primary Examiner—Everette A. Powell, Jr.
Attorney, Agent, or Firm—Laney, Dougherty, Hessin & Beavers

[57] ABSTRACT

A spinner-type electrical ceiling fan having a three part housing which includes a top plate, a central annular band and a bottom plate. The top and bottom plates are secured to, and movable with, the central annular band, and a plurality of blades are secured to, and project horizontally outwardly from, the bottom plate.

5 Claims, 5 Drawing Figures

CEILING FAN

BACKGROUND OF THE INVENTION

1. Field of the Invention

This invention relates to electrically powered ceiling fans, and more particularly to a spinner-type electrically powered ceiling fan in which the blades are secured to, and rotate with, the fan body.

2. Brief Description of the Prior Art

One type of electrically powered ceiling fan construction which has heretofore been known is the so-called spinner fan construction. In a spinner fan, the motor is constructed so that the external shell or housing of the motor, visible to one standing in the room where the fan is mounted to the ceiling rotates upon a down-rod or down-shaft. The rotating motor housing carries with it, fan blades which, in previous constructions, have been secured to the top of the motor housing. This construction necessarily means that the external shell or housing of the motor acts as the rotor, and that the motor stator is disposed internally and does not undergo rotation.

Because the fan blades are mounted on top of, and rotate with, the rotating motor housing, the fan must be mounted so that the fan blades are spaced far enough from the ceiling that no danger or problem exists of the fan blades contacting the ceiling. As a result of this required vertical spacing, the rotating motor housing, as well as a switch housing usually located therebelow, must themselves be spaced downwardly relatively far from the ceiling and there is, consequently, some undesirable reduction in head space between the lowermost part of the spinner fan so constructed and so mounted, and the tops of the heads of persons standing in the room where the ceiling fan is mounted.

Spinner-type ceiling fans of the described construction usually include a single or integrably formed motor housing in some instances, a two part motor housing. This construction of the mounting of the blades to the upper side of the housing causes the balancing of the fan to be slightly difficult, and to require some manipulation by optimize.

MOVED DESCRIPTION OF THE PRESENT INVENTION

The present invention provides a spinner-type ceiling fan which is constructed so that the blades are secured to the lower side of the rotating motor housing, and consequently the blades are inherently spaced greater distance from the ceiling than is the case in spinner fans of the prior art where the blades are mounted on the upper side of the housing. Spinner fans of the present invention are also characterized in having a three-part motor housing which facilitates the assembly of the fan during manufacture, and which allows the fan to be well balanced, and to be more stably supported from the ceiling than in prior types of spinner fans.

An important object of the invention is to provide an improved spinner-type ceiling fan which can be more quickly and easily mounted to the ceiling so that a relatively large clearance is provided over the heads of persons standing beneath the fan.

Another object of the invention is to provide a spinner-type ceiling fan which has a three-part motor housing construction permitting the fan to be assembled so that the bearings upon which the motor housing turns are more accurately seated and aligned to afford long term stability, and freedom from malfunction over extended periods of operation.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

The fan of the invention includes a canopy 10 by which the fan is mounted in a flush position against the ceiling. The canopy 10 receives and houses the electrical conductors which extend from this enclosure downwardly through a down rod 12. Generally, the canopy 10, which is slidable along the down rod 12, will be moved upwardly into position around an outlet box and mounting bracket by which the fan is suspended from the ceiling after the outlet box has been fastened to the ceiling with the electrical wires extending therethrough and through the down rod.

Figure 5:
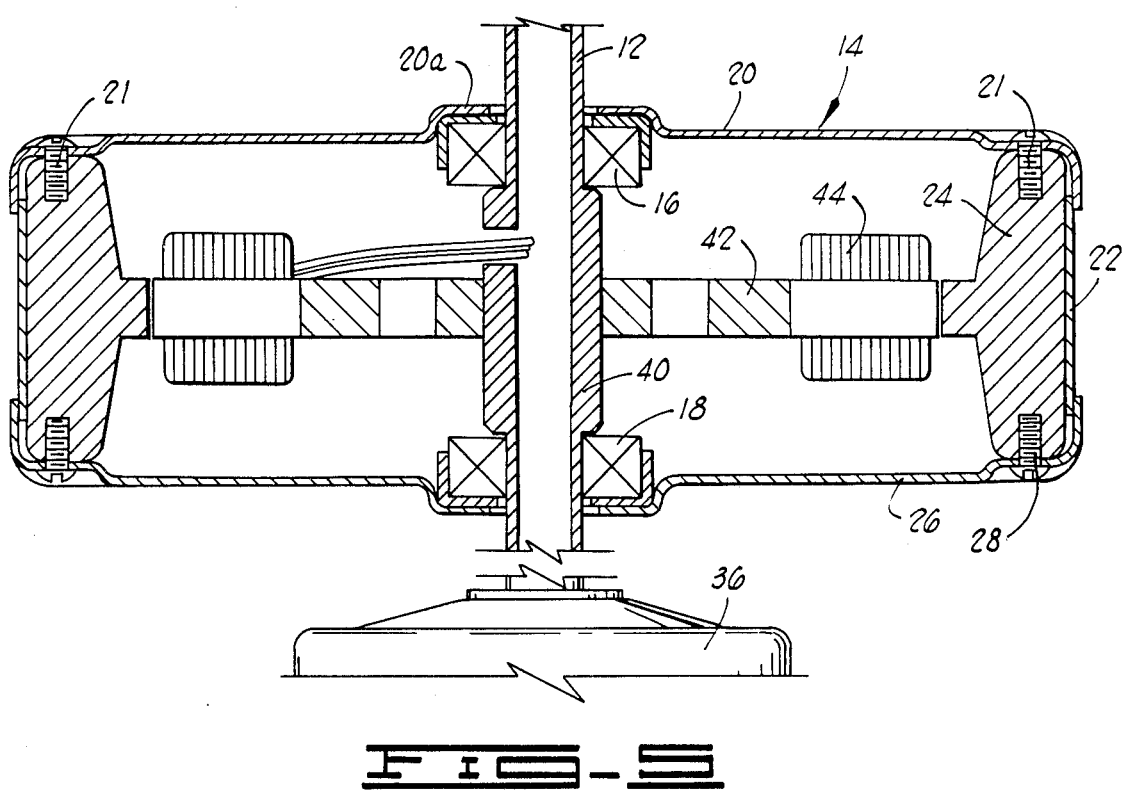
FIG. 5 is a vertical sectional view taken in a vertical plane which extends through the center of the fan housing, and illustrating the construction of the stator and rotor of the fan. The fan blades have been removed from this drawing for clarity of illustration.

A large, three-part housing, designated generally by reference numeral 14, is rotatably mounted on the lower end of the down rod 12 and can rotate on this rod by reason of a pair of bearing assemblies 16 and 18 shown in FIG. 5. The three part housing 14 includes a centrally apertured top plate 20 which is in the form of a round disc having a raised, bearing receiving hub 20a in the center thereof. The three part housing further includes an annular side band 22 which extends around and encloses a soft iron armature 24. The top plate 20 is secured by suitable screws 21 to the top of the armature 24. Finally, a bottom plate 26 is, like the top plate 20, secured by suitable screws 28 to the soft iron armature 24 so as to complete the closure of the three part housing.

Figure 1:
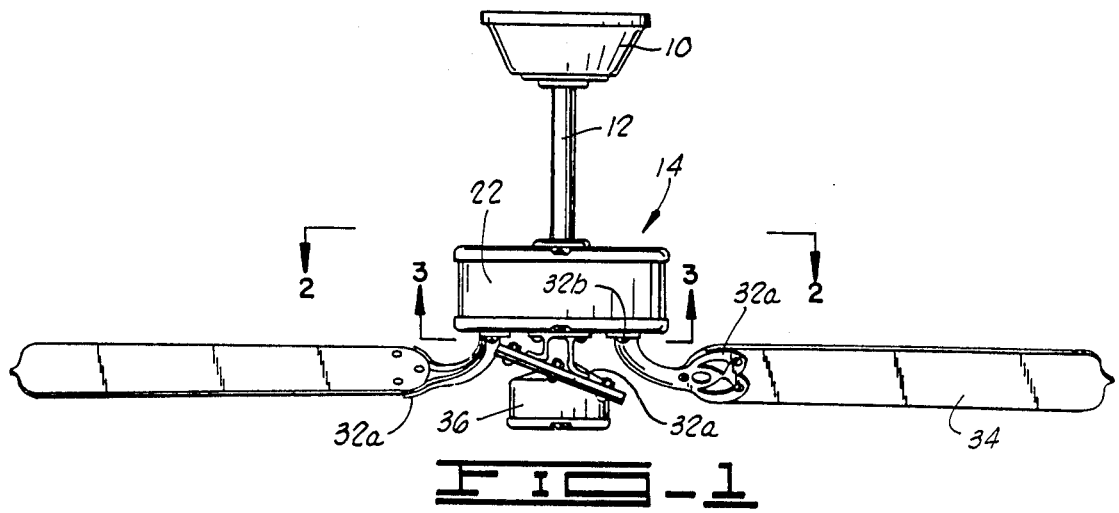
FIG. 1 is a side elevation view of a ceiling fan constructed in accordance with the present invention.
Figure 2:
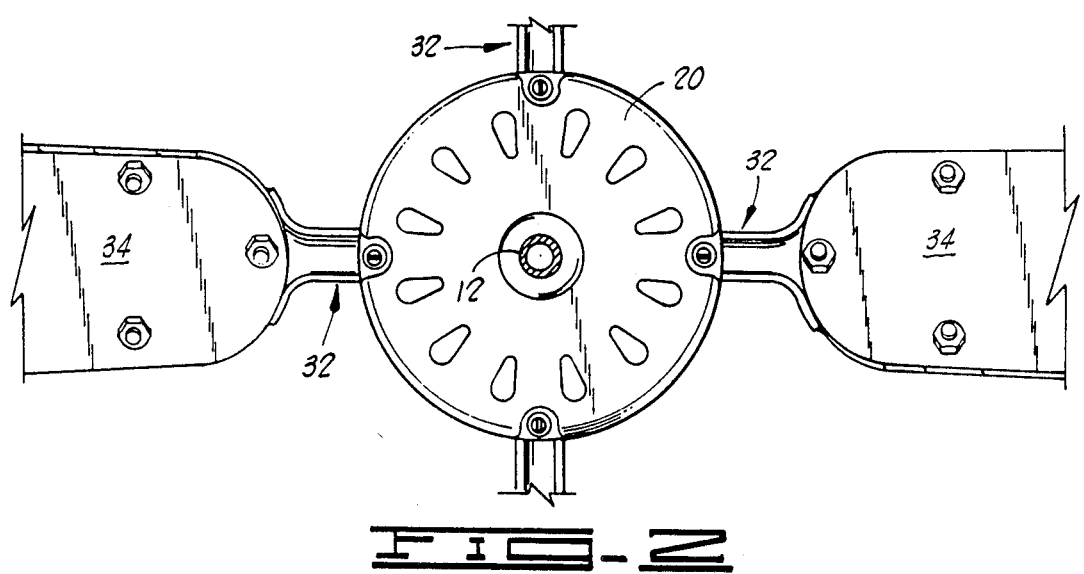
FIG. 2 is a sectional view taken along line 2—2 of FIG. 1.
Figure 3:
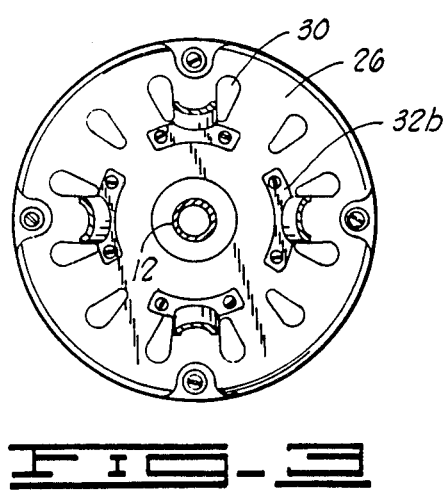
FIG. 3 is a sectional view taken along line 3—3 of FIG. 1.
Figure 4:
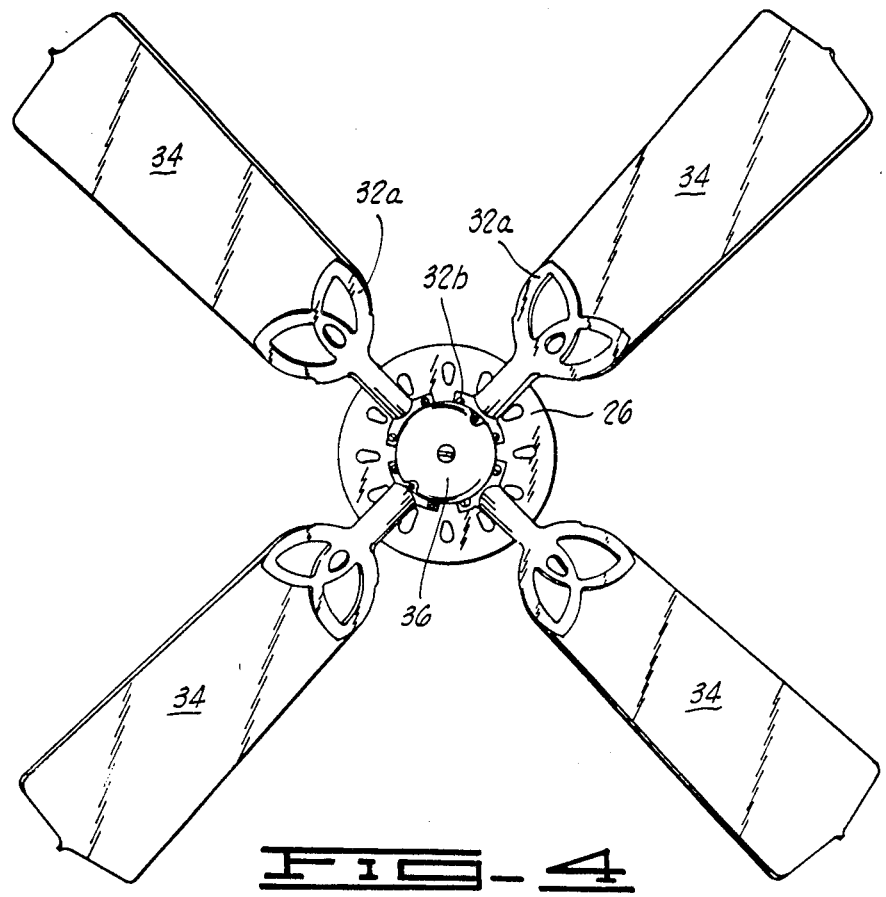
FIG. 4 is a bottom plan view of the fan shown in FIGS. 1-3.

As shown in FIG. 3, the bottom plate 26 has a plurality of radially extending slots or openings 30 formed therethrough. In the illustrated embodiment of the invention, four blade holder brackets, designated generally by reference numeral 32, are utilized for securing four paddle-type blades 34 to the lower side of the three part housing or, stated differently, to the bottom plate 26. Each of the blade holder brackets 32 includes a pretzel shaped, blade engaging portion 32a, and a bottom plate engaging portion 32b. The orientation and configuration of the blade holder brackets 32 is such that the blades are disposed substantially in a common horizontal plane, and are pitched upon an angulation as best illustrated in FIG. 1 of the drawings. A switch housing 36 is mounted on the lower end of the down rod 12 where the lower end portion projects through the three part housing 14. The switch housing 36 contains a switch which can be operated by a pull chain or the like for energizing the fan.

Within the three part housing 14, the down rod 12 carries an enlarged diameter central portion 40 which is disposed between the upper and lower bearing assemblies 16 and 18, respectively. A stator plate 42 is secured to the enlarged diameter central portion 40 of the down rod 12 and projects in a diametric plane with respect to the down rod. The stator plate 42 carries a plurality of copper wire windings 44 located adjacent its radially outer end and positioned to cooperate with the soft iron armature 24 forming the rotor of the motor by which the fan is driven in rotation.

From the foregoing description, it will be apparent that the three part housing 14 constitutes the rotor of the motor which drives the fan. The stator is contained internally of the housing and includes the stator plate 42 which carries the multiple copper windings 44. Therefore, both the housing 14 and the paddle type blades 34 secured to the underside thereof are driven in rotation when the motor is energized.

The three part housing is provided and constructed in the manner described greatly facilitates the ease with which the fan can be assembled. The seating of the bearing assemblies 16 and 18 by precise location of the bottom and top plates, 26 and 20, relative thereto assures that the fan will be better stabilized and will rotate with reduced wobble and vibration. It is easier to properly seat the bearings, and these can be adjusted up and down, as may be required, by reason of the ability to shift the parts of the three part housing. Moreover, the described construction permits better control of the air gap tolerance between the rotor constituted by the exterior portion of the housing, and the outer periphery of the stator plate 42.

The construction of the fan, as has been previously mentioned, further differs from heretofore proposed spinner type fans in having the fan blades secured to the lower side of the three part housing, or, in the case of the specific embodiment here illustrated, to the bottom plate 26. This construction permits the fan to be mounted much closer to the ceiling, since the blades themselves are not close to the ceiling, and there is no danger of wobble causing contact between the blades and the ceiling. This, in turn, gives more head clearance or head room between the fan blades and a person walking under the fan.

Although a preferred embodiment of the invention has been herein described, it will be understood that various changes in the depicted and described embodiment can be effected without departure from the basic principles upon which the invention is based. Changes and innovations of this type are therefore deemed to be circumscribed by the spirit and scope of the invention, except as the same may be necessarily limited by the appended claims, or reasonable equivalents thereof.

What is claimed is:

1. A ceiling fan comprising:
   a canopy positionable adjacent a ceiling surface;
   a down rod projecting downwardly from said canopy;
   a housing top plate defining an opening in the center thereof;
   a first bearing disposed in said opening in said top plate and rotatably mounting said top plate to said down rod;
   an iron armature detachably secured to said top plate;
   a housing bottom plate defining an opening therein and detachably secured to said iron armature;
   a second bearing disposed in said opening in said bottom plate and rotatably mounting said bottom plate to said down rod;
   an annular housing side band disposed between said top plate and said bottom plate and radially outwardly of said iron armature; and
   a stator plate assembly secured to said down rod at a location between said top plate and said bottom plate, said stator plate assembly including copper wire windings disposed opposite and in alignment with said iron armature.

2. The ceiling fan of claim 1 further comprising means for detachably mounting a plurality of fan blades to said housing bottom plate.

3. The ceiling fan of claim 1 wherein said down rod has an enlarged diameter central portion disposed between said first bearing and said second bearing.

4. The ceiling fan of claim 1 further comprising a switch housing attached to said down rod and disposed below said housing bottom plate.

5. The ceiling fan of claim 1 wherein at least one of said first and second bearings is adjustable upwardly and downwardly.

* * * * *

UNITED STATES PATENT AND TRADEMARK OFFICE
CERTIFICATE OF CORRECTION

PATENT NO. : 4,621,977

DATED : November 11, 1986

INVENTOR(S) : Michael A. Markwardt

It is certified that error appears in the above-identified patent and that said Letters Patent is hereby corrected as shown below:

Column 1, line 45, "MOVED" should read -- BROAD --.

Signed and Sealed this

Twenty-fourth Day of March, 1987

*Attest:*

DONALD J. QUIGG

*Attesting Officer*  *Commissioner of Patents and Trademarks*